United States Patent [19]

Hodge

[11] Patent Number: 5,125,487
[45] Date of Patent: Jun. 30, 1992

[54] METHOD AND APPARATUS FOR PROVIDING TORQUE CONVERTER HAVING IMPROVED STATOR/CLUTCH ASSEMBLY

[75] Inventor: Bobby L. Hodge, Charlotte, N.C.

[73] Assignee: INA Bearing Company, Inc., Fort Mill, S.C.

[21] Appl. No.: 576,066

[22] Filed: Aug. 31, 1990

[51] Int. Cl.⁵ ............................................. F16D 33/18
[52] U.S. Cl. .................... 192/3.34; 29/889.22; 60/341; 60/345
[58] Field of Search ............... 60/341, 345, 346, 362; 29/889.22, 889.5; 192/3.34

[56] References Cited

U.S. PATENT DOCUMENTS

| | | | |
|---|---|---|---|
| 3,163,988 | 1/1965 | Gabriel | 60/345 |
| 3,189,144 | 6/1965 | Gabriel | 60/362 X |
| 3,263,522 | 8/1966 | General | 60/362 X |
| 3,316,622 | 5/1967 | Jandasek | 29/889.5 |
| 3,343,367 | 9/1967 | General | 60/345 |
| 3,518,026 | 6/1970 | Iijima | 60/341 X |
| 3,732,957 | 5/1973 | McEwen | 192/45 |
| 4,117,677 | 10/1978 | Murakami et al. | 60/362 X |
| 4,441,315 | 4/1984 | Bochot | 60/345 |
| 4,643,283 | 2/1987 | Wonn | 192/3.33 |
| 4,714,803 | 12/1987 | Lederman | 192/41 R |
| 4,718,527 | 1/1988 | Kurihara | 192/54 |
| 4,757,887 | 7/1988 | Ostrander et al. | 192/41 A |
| 4,782,931 | 11/1988 | Lederman | 192/70.12 |
| 4,817,772 | 4/1989 | Sacher | 192/48.91 |
| 4,825,990 | 5/1989 | Sassi | 192/41 R |
| 4,953,353 | 9/1990 | Lederman | 60/345 |

FOREIGN PATENT DOCUMENTS 1178270  9/1964  Fed. Rep. of Germany ........ 60/362

OTHER PUBLICATIONS

Book of the Car, pp. 92-93, copyright 1976, Drive Publications Limited, published 1977.

*Primary Examiner*—Rodney H. Bonck
*Attorney, Agent, or Firm*—Wigman & Cohen

[57] ABSTRACT

A method of manufactore of, and apparatus for, a torque converter assembly having an improved reactor assembly. A torque converter is disclosed having a stator which has improved and simplified casting and machining requirements. A stator hub is provided having a cylindrical bore substantially coaxial with the axis of the transmission shaft to which the torque converter is mounted. An overrunning clutch and thrust bearing cartridge assembly is provided to be fitted into the stator hub bore. The overrunning clutch provides improved lubrication on both sides of the clutch engaging element surfaces, either rollers or sprags, between the inner and outer rings which form the clutch races. Wear surfaces within the clutch assembly are stamped steel instead of aluminum. Clutch load is increased by increasing the roller or sprag dimensions in the direction of the stator axis, while maintaining the same stator hub width. Thrust bearings are mounted to the outside of the overrunning clutch.

21 Claims, 6 Drawing Sheets

METHOD AND APPARATUS FOR PROVIDING TORQUE CONVERTER HAVING IMPROVED STATOR/CLUTCH ASSEMBLY

FIELD OF THE INVENTION

The present invention relates generally to the vehicle automatic transmission art, and more particularly to torque converters for improving the transfer of torque between engines and transmissions.

DESCRIPTION OF THE PRIOR ART

A typical torque converter is comprised of an impeller which is attached to the engine, a turbine which is attached to the transmission and driven by the impeller and a reaction device or stator which is coaxially interposed between the impeller and turbine. The stator redirects the transmission coupling fluid to enhance the torque transferred between the engine and the transmission. Typically, the stator is mounted through a one-way overrunning clutch to a hollow splined sleeve which is fixed relative to the transmission housing. The combined stator and clutch are referred to herein as the reactor assembly. The turbine shaft is rotatably mounted within the hollow splined sleeve. At low engine revolutions, the stator is fixed; however, at higher engine revolutions, the stator is allowed to freewheel. The fixed or freewheeling condition of the stator is accomplished by the engagement and disengagement, respectively, of the one-way overrunning clutch disposed between the stator and the splined sleeve.

Prior art reactor assemblies are usually made of a stator hub and blade cast as an integral unit, typically of aluminum. The stator has a bore into which the clutch is fitted. Thrust bearings are located on both sides of the stator adjacent the clutch, and serve as bearing surfaces between the reactor assembly and the impeller and turbine, respectively. The cylindrical bore of the prior art stator has at least one step or shoulder, with the bore thereby having two, stepped coaxial diameters. The shoulder serves as an abutment against which the clutch bears when it is placed in the stator. The clutch is then held in place in the stator by a snap ring or circlip which is fitted into a circumferential groove machined in the larger diameter portion of the cylindrical bore. Thrust bearings are mounted to both sides of the assembled stator and clutch and this entire assembly is mounted on the splined sleeve attached to the transmission housing.

This prior art reactor assembly, while functionally adequate, has at least one disadvantageous assembly feature and is susceptible to wear. At a minimum, if the clutch is mounted and secured with the stator prior to mounting the reactor assembly in the torque converter, then the thrust bearings must be mounted separately at the time of assembly of the torque converter. One or more additional steps in the assembly of the stator and clutch may thus be involved which add to the total number of steps in the assembly of an entire transmission. The presence of the shoulder in the axial bore of the stator results in additional machining requirements, because the shoulder must be machined along the surfaces which are in contact with the moving parts of the clutch. Also, the shoulder limits lubrication of the clutch elements to lubrication ports on one side of the stator only. In the prior art configuration, several aluminum surfaces are in contact with the clutch and subject to relative movement with the clutch, which results in increased wear. Also, as a consequence of the configuration of the reactor assembly with a step or shoulder in the cylindrical bore, the axial dimension of the engaging elements (roller or sprag) in the overrunning clutch is reduced thereby reducing the load-carrying capacity for those engaging elements.

SUMMARY OF THE INVENTION

In view of the foregoing, it should be apparent that a need exists for an improved reactor assembly that overcomes the problems associated with the prior art devices of this type.

It is, therefore, a primary object of this invention to provide a reactor assembly in which the clutch has increased load-carrying capacity.

A further object of the invention is to provide a reactor assembly in which the bearings and clutch can be assembled in a unit in a substantially better environment than is customarily found in a transmission facility.

Yet another object of this invention is to provide a torque converter reactor assembly having an overrunning clutch combined with thrust bearings to form a cartridge.

Still another object is to provide a reactor assembly in which the overrunning clutch has improved lubrication.

Another object of this invention is to provide a reactor assembly having improved wear characteristics.

A further object is to provide a stator which is cast aluminum and has reduced machining requirements.

Yet another object is to provide a method of manufacture of an improved reactor assembly.

Briefly described, these and other objects and advantages that may become apparent hereinafter are accomplished in accordance with the present invention by providing a reactor assembly including an overrunning clutch and thrust bearings assembled in cartridge form. The present invention comprises a stator having integral hub and blades, which is made of any suitable material, preferably aluminum. In a preferred embodiment, the cast stator has an essentially cylindrical bore of a constant diameter, coaxial with the axis of the stator, into which two circumferential grooves are machined. The clutch and thrust bearing cartridge of the present invention includes an inner ring and an outer ring forming inner and outer races for the overrunning clutch rollers or sprags biased therebetween by springs and retainer stops. Retention plates mounted on either side of the inner and outer rings form an enclosure for the clutch assembly. The retention plates secure the rollers or sprags axially, secure the spring cage, and locate the inner ring relative to the outer ring with the rollers or sprags disposed therebetween. The location of the retention plates on both sides of the inner and outer rings, as distinguished from one retention plate in the prior art, provides concentric alignment on both sides of the rings or "double piloting" of the inner ring as the outer ring moves relative to it when the clutch is disengaged and the stator freewheels. Tabs on the retention plates hold thrust bearings on either side of the assembly. Lubrication ports are provided at angular intervals around the circumference of the retention plates, at the radial location where the rollers or sprags reside in the clutch race.

The entire clutch and thrust bearing cartridge is placed in the cylindrical bore of the stator and secured in place with snap rings or circlips inserted in the two circumferential grooves, one to each side of the clutch assembly. It is contemplated that, in lieu of snap rings fitted to circumferential grooves, the clutch and thrust bearing assembly can be secured to the stator bore by press fitting, welding, bonding, staking, or any other suitable means. The outer ring can be keyed to the cylindrical stator bore so as not to rotate relative to the stator by, for example, the provision of cast indentations located at symmetrical angular positions in the stator, with corresponding mating raised projections in the outer ring. Similarly, the inner ring is keyed to prevent rotation relative to the splined sleeve by providing corresponding indentations and projections in the surface of the inner ring which mate with the splines of the splined sleeve.

The present invention thus provides a number of advantages over the prior art. The reactor assembly of the torque converter is improved because the clutch and thrust bearing cartridge can be assembled in the environment of a typical bearing manufacturing plant. That assembly can then be inserted in the stator to form a reactor assembly in the same environment. Thus, an entire reactor assembly can be provided which is then mounted between the impeller and turbine assembly at the time the transmission is assembled. The present invention advantageously results in considerable reduction of machining of the stator, requiring only that the snap ring or circlip grooves be circumferentially machined into the inner cylindrical bore of the stator hub. Thus, the machining of step or shoulder surfaces is eliminated. Also, the wear surfaces of the stator are eliminated. Parts which move relative to each other in the reactor assembly can be made from materials other than the material from which the stator is fabricated, resulting in the wear surfaces typically being made of stamped hardened steel rather than cast aluminum. The provision of lubrication ports on either side of the clutch elements within the clutch improves lubrication to these clutch elements, whether they are rollers or sprags. Finally, because the shoulder or step has been eliminated from the stator, without increasing the overall axial dimension of the stator, the axial dimension of the engaging elements can be significantly increased. This results in an increase of the load-carrying capacity for the clutch assembly, which in turn results in an increased power density and increased torque transmission capability.

With the foregoing and other objects, advantages and features of the invention that will become hereinafter apparent, the nature of the invention may be more clearly understood by reference to the following detailed description of the invention, the appended claims and to the several views illustrated in the attached drawings.

BRIEF DESCRIPTION OF THE DRAWINGS

FIG. 2b is a cross-sectional view of a prior art reactor assembly, taken through section 2b—2b of FIG. 2a;

DETAILED DESCRIPTION OF A PREFERRED EMBODIMENT

Figure 1A:
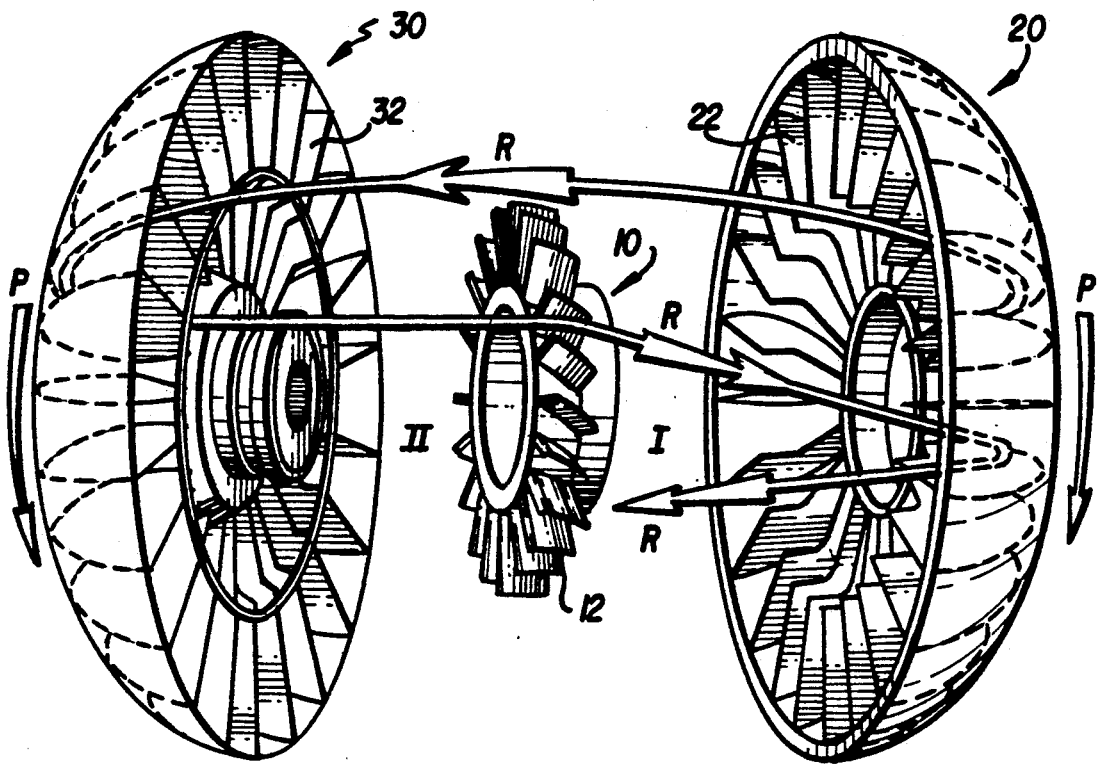
FIG. 1a an exploded perspective view of a prior art torque converter impeller, stator and turbine.

Referring now in detail to the drawings wherein like parts are designated by like reference numerals throughout, there is illustrated in FIG. 1a a typical prior art torque converter having a reaction device, usually called a stator, generally designated by the numeral 10, interposed between an impeller 20 and a turbine 30. The stator 10 includes blades 12. The impeller 20 includes blades 22 and the turbine 30 includes blades 32. Arrows R show the flow path of the coupling fluid, in this case transmission oil, through the impeller blades 22, the stator blades 12 and the turbine blades 32. Arrows P show the direction of rotation of the turbine 30 and the impeller 20.

Figure 1B:
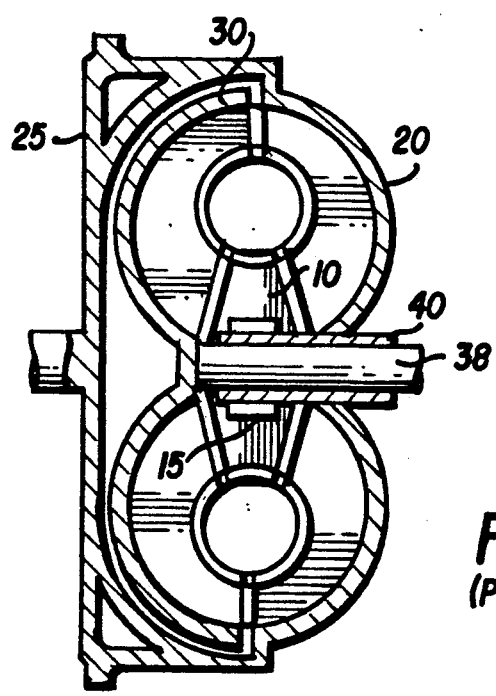
FIG. 1b is a diagrammatic side view of an assembled prior art torque converter.

Referring to FIG. 1b, impeller 20 is attached to an engine flywheel 25, which is in turn driven by an engine (not shown). Turbine 30 is attached to a transmission shaft 38. The stator 10 is coaxially interposed between the impeller 20 and the turbine 30, mounted on an overrunning clutch 15, which is in turn mounted on a splined sleeve 40. Thrust bearings (not shown) are normally mounted on each axial side of the stator 10 between the stator 10 and the impeller 20 and turbine 30, respectively, the positions being indicated by Roman numerals I and II in FIG. 1a. In the typical prior art torque converter, when the engine is operating at low engine revolutions, the overrunning clutch 15 is engaged and the stator 10 is non-rotatable with respect to splined sleeve 40 and hence does not rotate with respect to either impeller 20 or turbine 30. However, at higher engine revolutions, the overrunning clutch 15 disengages and permits the stator 10 to freewheel about the splined sleeve 40. Thus, the fixing and freewheeling of the stator 10 is accomplished by the engaging and disengaging of the overrunning clutch 15 in relation to the relative direction of rotation. The operation of the overrunning clutch 15 permitting such free rotation will be apparent from the discussion of the reactor assembly which follows.

Figure 2A:
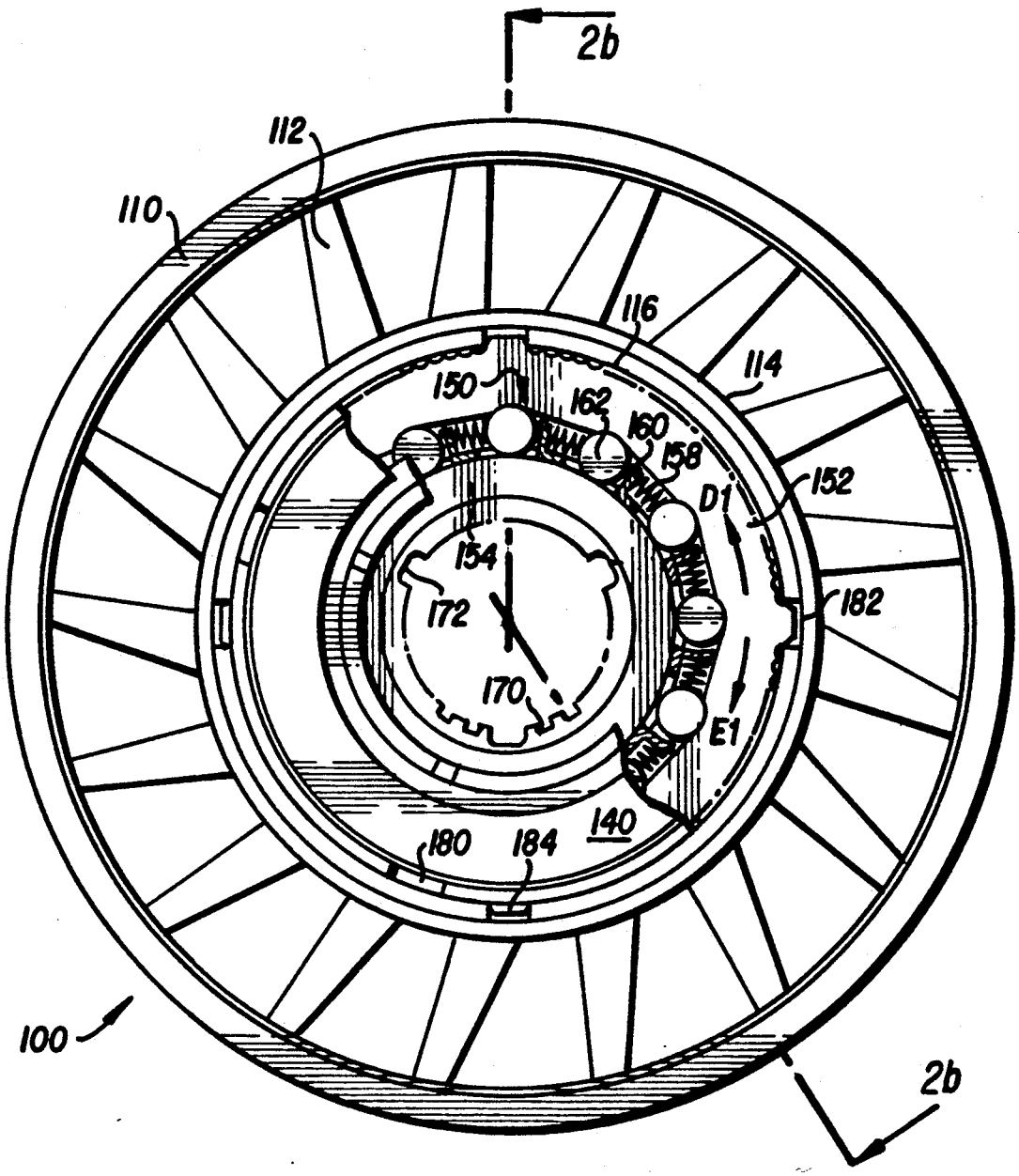
FIG. 2a is a partially-fragmented end view of a prior art reactor assembly.
Figure 2B:
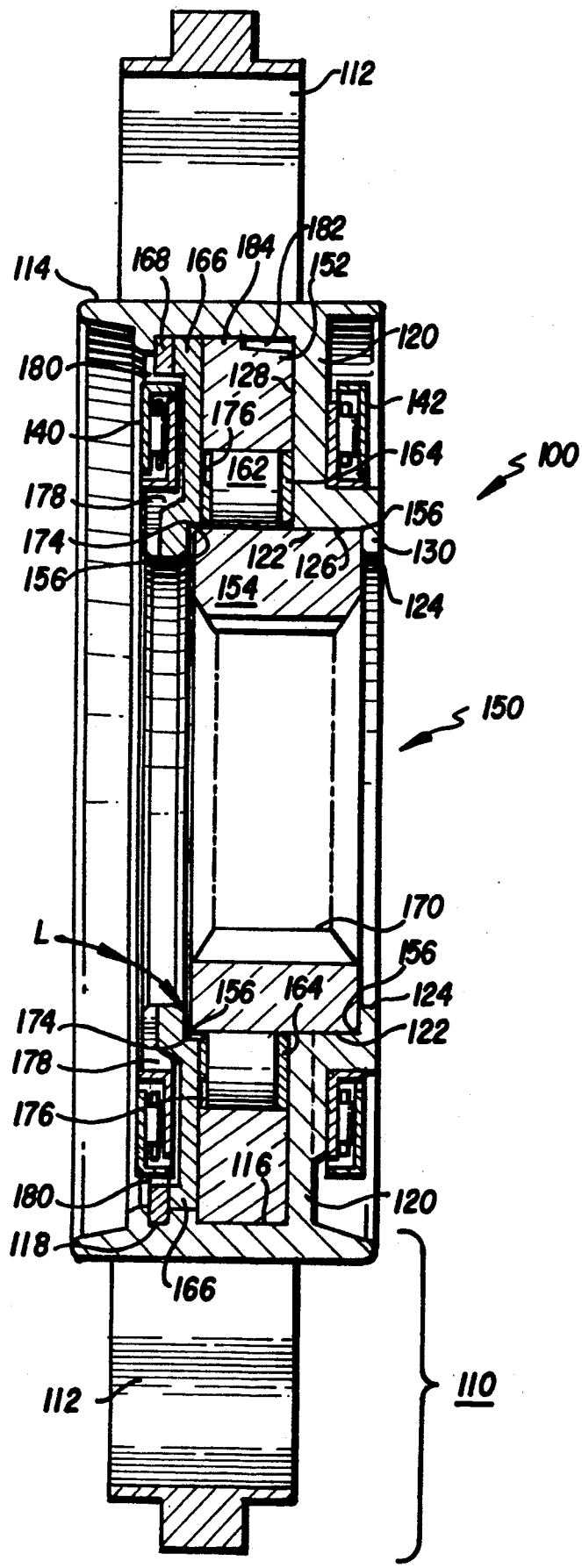

FIG. 2a shows a prior art reactor assembly, generally designated by the numeral 100. FIG. 2b is a view taken through section 2b—2b, of the reactor assembly 100. The reactor assembly 100 is comprised of two major components, a stator 110 and an overrunning clutch 150. The stator 110 includes stator blades 112 and a stator hub 114.

The stator 110 is typically a casting, preferably of aluminum. As will be recognized, the stator casting is moderately complex, and several machining operations are required to finish the stator part. As shown in FIGS. 2a and 2b, the stator 110 includes a cylindrical bore 116, having a circumferential groove 118, a shoulder 120, a step 122 and a flange 124. Cylindrical bore 116 is formed as part of the casting, but requires machining to form circumferential groove 118, and finished surfaces for shoulder 120, step 122 and flange 124. These finished surfaces are designated 126, 128 and 130, and are located at the interfaces between the stator hub 114 and the overrunning clutch 150.

In order for the stator 110 to be mounted securely and operatively between an impeller and a turbine, the overrunning clutch 150, must be mounted in the bore 116 formed in the stator 110, with a thrust bearing 140 mounted on the outside of the overrunning clutch 150 and a thrust bearing 142 mounted on the outside of stator hub 114, to serve as bearing surfaces between the stator 110 and the impeller and turbine. The overrunning clutch 150 comprises an outer ring 152, an inner ring 154 and a plurality of engaging elements 162 preferably disposed in a cage 164 and interposed between the rings 152, 154. Inner ring 154 has beveled edges 156. The engaging elements 162 are resiliently biased into engagement with the rings 152, 154 by springs 158 which force the bearings in a direction away from retainer stops 160 formed in the cage 164. As best shown in FIG. 2b, the caged engaging elements 162 and the rings 152, 154 are held in place on one side by the shoulder 120 and flange 124 of the stator 110 and on the other side by an annular retention plate 166. This entire assembly is held within the stator 110 by a snap ring or circlip 168 fitted into groove 118. Inner ring 154 is keyed as at 170 and 172, to fit over a splined shaft (not shown) which is attached to the transmission housing (not shown).

Lubrication to space 176 is provided only through passages 174 between retention plate 166 and the beveled edges 156 of the inner ring 154. Outer ring 152 is non-rotatably fixed to the stator 110 by symmetrically arranged projections 184 which are keyed to aligned slots 182 in the bore 116 of the stator.

The race formed for each engaging element 162 by rings 152, 154 is convergent in the clockwise direction as viewed in FIG. 2a. Thus, as is known in the art, at low engine revolutions, the balance between coupling fluid flow forces and the biasing forces of springs 158 causes the engaging elements 162 to be wedged in the convergent space between the inner ring 154 and the outer ring 152. The clutch 150 is thus engaged when the springs 158 urge the engaging elements 162 clockwise as shown by arrow E1 in FIG. 2a toward the retainer stops 160 and is disengaged when the engaging elements 162 compress the springs 158 by the force resulting from an increased coupling fluid flow and move counter-clockwise (shown by arrow D1) to the position shown in FIG. 2a so that they are no longer wedged between rings 152, 154. With the clutch 150 engaged, the two rings 152, 154 and the components mounted to them move together at the same speed. Since, of course, inner ring 154 is mounted to a non-moving splined sleeve (FIG. 1b), when the clutch 150 is engaged, the entire reactor assembly 100 does not rotate. At high engine revolutions, however, the engaging elements 162 are disengaged and the outer ring 152 is free to move, as a result of coupling fluid flow, relative to the non-moving inner ring 154. This results in the stator 110 freewheeling about the splined sleeve.

As one skilled in the art will recognize, the prior art configuration shown, and those similar to it, has a number of interfacing surfaces which move relative to one another. For example, the interfacing surface 128 between shoulder 120 and cage 164, the interfacing surface 126 between inner ring 154 and step 122, and the interfacing surface 130 between inner ring 154 and flange 124 move relative to each other. Thus, the typical choice of materials, aluminum for the stator 110 and hardened steel or some equally hard material for the inner ring 154 results in disproportionate wear on the aluminum stator. In addition, as one skilled in the art will recognize, limited lubrication (shown by arrow L) is provided through passages 174 into space 176 for lubricating the engaging elements 162 of the overrunning clutch 150.

In addition to fabrication (machining) and wear considerations, the prior art reactor assembly shown, and those similar to it, require the thrust bearing 142 to be mounted on the splined sleeve substantially separate from the rest of the reactor assembly. Finally, because of the axial dimension needed for machining the shoulder 120 and flange 124 in the stator bore 116, the axial dimension available for the engaging elements 162 is reduced, thereby limiting the load-bearing capacity, power density and torque output of the reactor assembly 100.

Figure 3A:
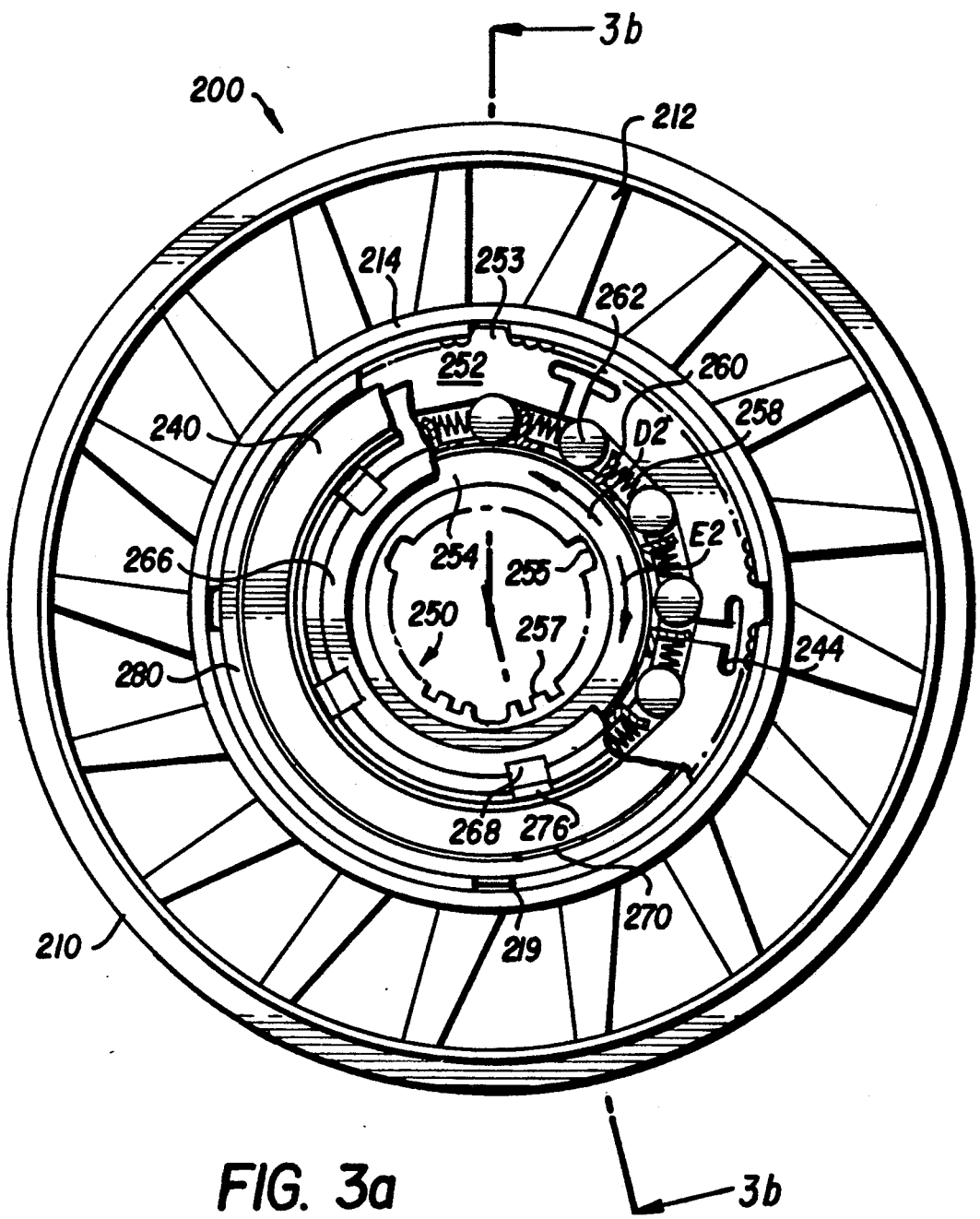
FIG. 3a is a partially-fragmented end view of a reactor assembly of the present invention.
Figure 3B:
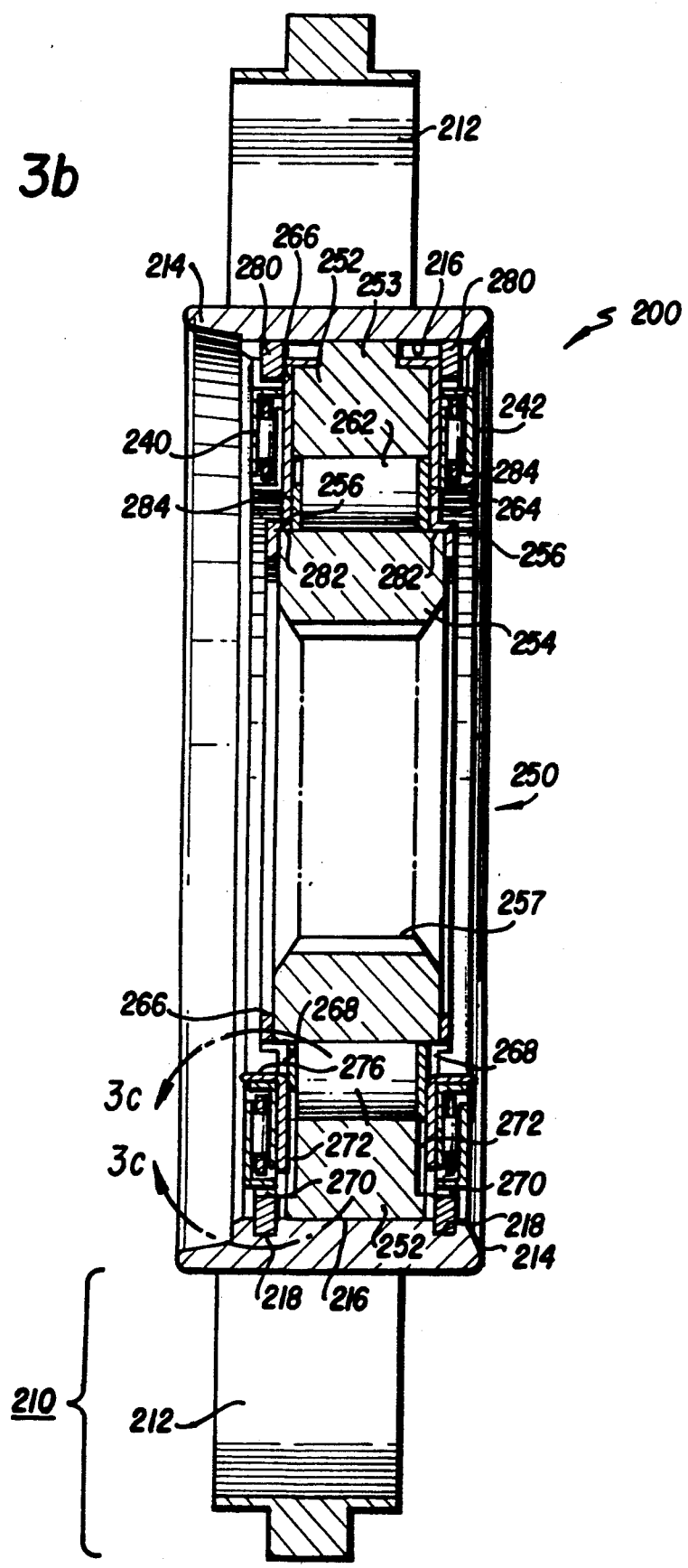
FIG. 3b is a cross-sectional view of a reactor assembly of the invention, taken through section 3b—3b of FIG. 3a; an FIG. 3c is an enlarged detail view of the clutch lubrication port and thrust bearing mounting shown in detail 3c of FIG. 3b.
Figure 3C:
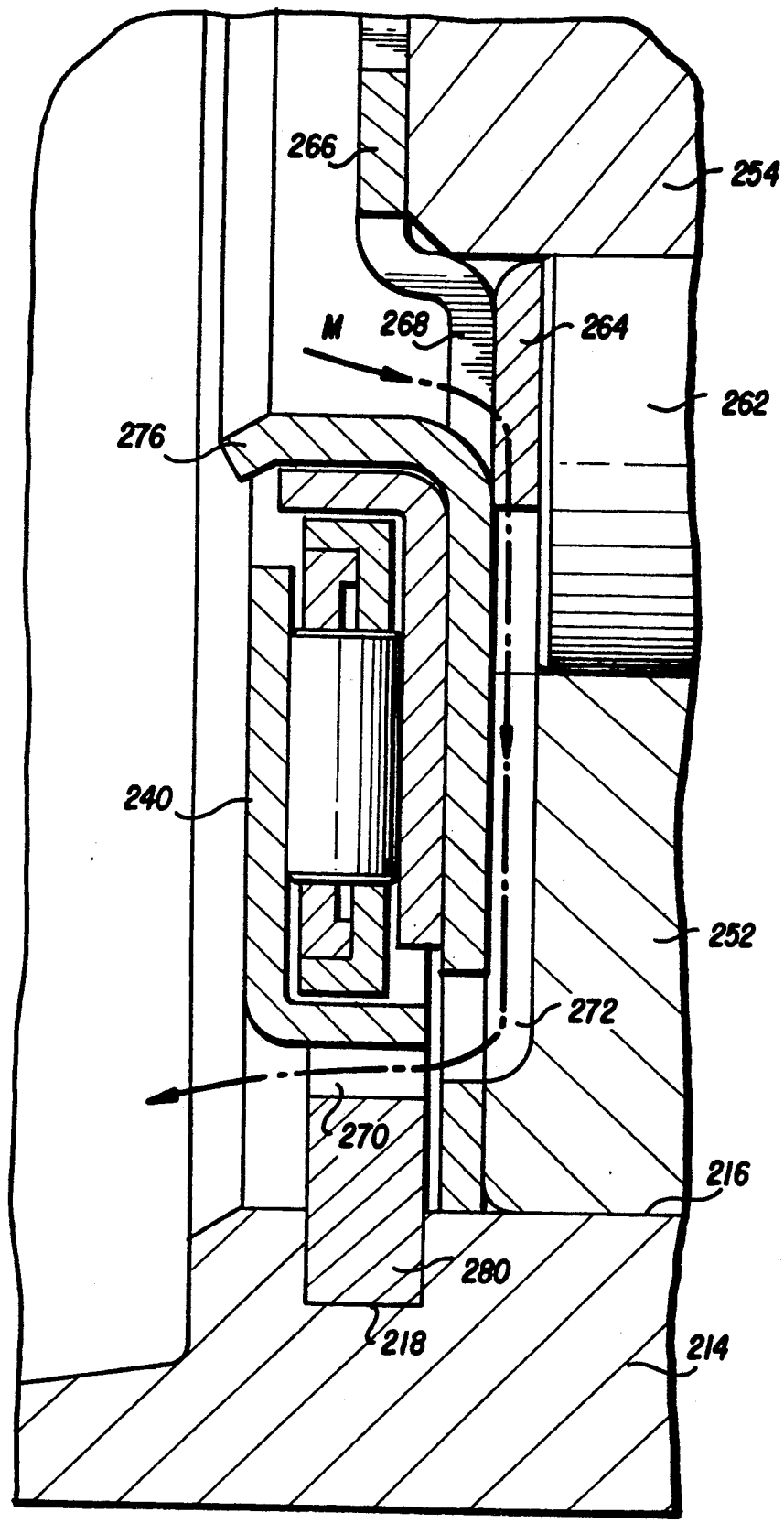

The present invention involves a method and apparatus, an embodiment of which is shown in FIGS. 3a, 3b and 3c. The improved reactor assembly 200 of the present invention comprises two main components, a stator 210 and an overrunning clutch and thrust bearing cartridge assembly 250.

Stator 210 includes blades 212 and a hub 214 similar to the prior art stator 110 (FIGS. 2a and 2b). The casting of stator 210 of the present invention includes an essentially cylindrical through bore 216 into which a one-way overrunning clutch and thrust bearing cartridge assembly 250 ("clutch 250") can be fitted. The bore 216 is substantially coaxial with the transmission splined sleeve (not shown) and has a substantially constant diameter. The casting of the stator 210 provides circumferentially symmetric keyed indentations 219 matched to projections 253 of an outer ring 252 of the clutch 250, but otherwise provides no steps or shoulders, and none which must be machined to serve as bearing surfaces for the relative movement of parts. The only machining which is required for the casting of stator 210 is the provision of two circumferential grooves 218 in the bore 216, spaced axially apart to accommodate the clutch 250.

The clutch 250, shown in FIGS. 3a and 3b, includes an inner ring 254 and an outer ring 252. The inner ring 254 has beveled edges 256 and is keyed to fit on a splined shaft (not shown) by one or more projections 257. Interposed between the inner ring 254 and the outer ring 252 is a plurality of engaging elements 262, which act as cams and which may be either sprags or rollers. Engaging elements 262 are spring-biased by springs 258 and retainer stops 260. Inner ring 254 and outer ring 252 form a race convergent in the clockwise direction shown in FIG. 3a. The axial dimension of the engaging elements 262 corresponds substantially to the axial dimension of the cylindrical stator bore 216 between the circumferential grooves 218. A cage 264 secures the engaging elements 262 in place. Retention plates 266 mounted on both sides of the clutch 250 encompass the outer ring 252, the engaging elements 262, springs 258, retainer stops 260 and the inner ring 254.

FIG. 3c shows an enlarged detail 3c of a retention plate 266, along with the mountings for thrust bearing 240 (for which thrust bearing 242 is identical) and the lubrication of engaging elements 262. A plurality of lubrication ports 268 and 270 to access space 272 are provided at symmetrical locations to lubricate each side of the engaging elements 262, as opposed to the small passage 174 and space 176 in the prior art clutch illustrated in FIGS. 2a and 2b. This permits coupling fluid to flow past the engaging elements 262, as shown by arrow M. Lubrication ports 270 communicate with a plurality of lubricant reservoirs 274 (FIG. 3a). Additionally, a plurality of tabs 276 holds thrust bearing 240 (and 242, not shown in FIG. 3c) in place. Tabs 276 may be integrally formed from retention plate 266. The entire clutch 250 is then mounted in the stator 210 by means of snap rings or circlips 280 fitted to circumferential grooves 218. Although the use of two circumferential grooves 218 in bore 216 is preferred, it is contemplated that clutch 250 can be secured to the stator 210 by press fitting, welding, bonding, staking, or other suitable means, the clutch 250 to the bore 216.

The operation of clutch 250 is the same as in the prior art. As before, the balance of the fluid coupling forces and spring biasing forces results in the engagement of the clutch 250 by the movement of the engaging elements 262 in the direction E2 to wedge the engaging elements 262 between the convergent race of inner ring 254 and outer ring 252 which results in maintaining the stator 210 in a fixed position. The disengagement of the clutch 250 by the engaging elements 262 moving in the direction D2 toward springs 258 into the divergent space between rings 252, 254 results in freewheeling of the stator 210.

The material selection for the stator 210 is the same as in the prior art, cast aluminum. The retention plates 266 of the clutch assembly 250 are preferably of a hardened material such as stamped steel and hence provide considerably better wear characteristics than aluminum. Wear surfaces at the interfaces 282 and 284 (FIG. 3b) are all of hardened material such as stamped steel, thus eliminating aluminum wear surfaces.

An examination of the device of the present invention shows a number of substantial advantages over the prior art. Among these, the wear surfaces between the inner ring 254 and the retention plates 266, which will move relative to the inner ring 254 when the stator 210 freewheels, are all made of hardened materials such as stamped hardened steel and hence are resistive to wear. No moving wear surfaces are made of cast aluminum. Wear is thus reduced or eliminated in the clutch cage 264, inner ring 254 areas and along moving surfaces of retention plates 266. The retention plates 266 secure the engaging elements 262 (rollers or sprags) and locate the inner ring 254 relative to the outer ring 252 and to the engaging elements 262. Because there are two retention plates 266 instead of one as in the prior art device, the plates 266 provide concentric alignment or double piloting of the inner ring 254 when the outer ring 252 moves relative to the inner ring 254 when the clutch 250 is disengaged and the stator 210 freewheels. Improved lubrication is provided through lubrication ports 268 and 270 to lubricate both sides of engaging elements 262, thereby increasing the life of clutch 250. The thrust bearings 240, 242 are mounted to ride on hardened steel, rather than aluminum. Because the clutch 250 is in cartridge form, more accurate concentric alignment or piloting of the clutch 250 within the stator 210 is permitted. Additionally, the overrunning clutch and thrust bearing cartridge 250 can be put together at a separate location with its own cleanliness requirements and can then be introduced as a cartridge at the transmission plant assembly point. Alternatively, the entire reactor assembly 200 can be assembled in a different location from the transmission assembly, having its own cleanliness requirements, and then mounted on the transmission itself at the assembly point. Machining costs and steps are reduced or eliminated because the shoulder or steps in the stator bore 216 are eliminated and no moving parts come in contact with the stator 210 casting itself. Because the axial dimension of engaging element 262 is increased to occupy a greater portion of the axial dimension of the cylindrical bore 216 of stator 210, the load-bearing capabilities of the reactor assembly 200 are increased by up to 60% as compared with prior art reactor assemblies having the same overall dimensions; this results in a significant power density improvement and thereby increased torque output.

The method of the invention comprises the steps of providing a reactor device such as a stator; forming an essentially cylindrical axial bore in the hub of the reaction device, the bore being free of steps or shoulders; mounting a clutch in the bore; permitting the reaction device to be engaged or disengaged from a fixed position by providing a clutch having over an axial bearing distance substantially the same as the axial dimension of the reaction device bore; providing lubrication to both sides of the clutch; providing moving parts which have contact surfaces made of hardened materials; and providing thrust bearings for contact with the impeller and turbine by mounting the thrust bearings on the outside of the clutch, thereby forming a clutch and thrust bearing cartridge. In a preferred embodiment of the method, the mounting step includes providing a pair of circumferential grooves in the cylindrical bore spaced axially apart along the bore axis and then mounting a clutch in the bore between a pair of snap rings disposed in the circumferential grooves.

Although certain presently preferred embodiments of the invention have been described herein, it will be apparent to those skilled in the art to which the invention pertains that variations and modifications of the described embodiment may be made without departing from the spirit and scope of the invention. Accordingly, it is intended that the invention be limited only to the extent required by the appended claims and the applicable rules of law.

What is claimed is:

1. In a torque converter having an impeller, a turbine and a reactor assembly adapted to be mounted therebetween on a stationary sleeve, the reactor assembly comprising:
   (a) means for reacting to coupling fluid flowing between said impeller and said turbine, said reacting means having formed therein an essentially cylindrical axial bore having a substantially constant diameter;
   (b) means for engaging and disengaging said reacting means to restrict and permit free wheeling motion of said reacting means relative to the stationary sleeve, said engaging and disengaging means received within said reacting means bore;
   (c) contact surfaces between said engaging and disengaging means and said reacting means, said engaging and disengaging means and said reacting means being immovable relative to each other at said contact surfaces, and
   (d) thrust bearing means, mounted on the sides of said engaging and disengaging means by one or more tabs integrally formed from the sides of said engaging and disengaging means, for supporting the impeller and the turbine against said reactor assembly.

2. In a torque converter having an impeller, a turbine and a stator adapted to be mounted therebetween on a stationary sleeve, a clutch comprising means for engaging and disengaging the stator to restrict and permit free wheeling motion of the stator relative to the stationary sleeve, said engaging and disengaging means adapted to be received within the stator in an essentially cylindrical axial bore having essentially one diameter, said engaging and disengaging means and said stator having contact surfaces, said engaging and disengaging means and said stator adapted to be immovable relative to each other at said contact surfaces, bearing means mounted to said engaging and disengaging means by one or more tabs integrally formed from the sides of said engaging and disengaging means for supporting the impeller and the turbine against said clutch.

3. A method of manufacture of a reactor assembly, adapted to be mounted on a stationary sleeve between an impeller and a turbine in a torque converter, comprising the steps of:
 (a) providing a reaction device;
 (b) forming an essentially cylindrical axial bore in the hub of said reaction device, said bore being substantially free of steps or shoulders;
 (c) mounting a cartridge clutch and thrust bearing assembly in said bore as a single unit independent of said reaction device;
 (d) permitting the reaction device to be engaged in a fixed position to prevent freewheeling relative to said stationary sleeve or disengaged from a fixed position to permit freewheeling by providing a plurality of bearings for the clutch, said bearings each having an axial dimension substantially the same as the axial dimension of the reaction device bore;
 (e) providing lubrication to both sides of the clutch bearings in a flow path around thrust bearings of said assembly and axially past said clutch bearings; and
 (f) providing moving parts which have contact surfaces made of hardened materials.

4. In a torque converter having an impeller, a turbine and a reactor assembly adapted to be mounted therebetween on a nonrotatable sleeve, the reactor assembly comprising:
 (a) means for reacting to coupling fluid flowing between said impeller and said turbine, said reacting means having formed therein an essentially cylindrical axial bore having a substantially constant diameter;
 (b) means for engaging and disengaging said reacting means to restrict and permit free wheeling motion of said reacting means relative to the nonrotatable sleeve, said engaging and disengaging means received within said reacting means bore and adapted to engage said nonrotatable sleeve, said engaging and disengaging means comprising:
  (i) cam means for wedging said reacting means relative to said nonrotatable sleeve in an engaged position and releasing said reacting means relative to said nonrotatable sleeve in a disengaged position,
  (ii) retention means, having inner surfaces and outer surfaces, cooperating with said cam means surfaces and outer surfaces, cooperating with said cam means at said inner surfaces for retaining said cam means between said reacting means and said nonrotatable sleeve, and for providing alignment of said cam means relative to both sides of said cylindrical bore,
  (iii) bearing means for bearing said reacting means against said impeller and against said turbine, said bearing means mounted on outer surfaces of said retention means,
said cam means enclosed by and mechanically engaging said retention means and said bearing means mounted on said retention means so as to cooperate to form an engaging and disengaging means cartridge unit mountable as a single unit independent of said reacting means within said cylindrical axial bore; and
 (c) contact surfaces between said engaging and disengaging means and said reacting means, said engaging and disengaging means and said reacting means being immovable relative to each other at said contact surfaces.

5. A reactor assembly as in claim 4, wherein said cam means comprises an inner ring, an outer ring, a plurality of rollers, and spring-biasing means for positioning said rollers, said rollers spring-biased by said spring-biasing means and retained between said inner and outer rings by said retention means comprising a pair of retention plates mounted at opposite axial ends of said rollers.

6. A reactor assembly as in claim 4, wherein said cam means comprises an inner ring, an outer ring, a plurality of sprags, and spring-biasing means for positioning said sprags, said sprags spring-biased by said spring-biasing means and retained between said inner and outer rings by said retention means comprising a pair of retention plates mounted at opposite axial ends of said sprags.

7. A reactor assembly as in claim 4, wherein said axial cylindrical bore includes a pair of axially-spaced circumferential grooves machined therein as the only machined surfaces in said bore and wherein further said engaging and disengaging means is held in said reacting means by a pair of snap rings fitted to said circumferential grooves.

8. A reactor assembly as in claim 4, further comprising means for lubricating said engaging and disengaging means from both the side located next to the impeller and the side located next to the turbine, said lubricating means comprising one or more lubrication ports formed in said retention means at locations where said bearing means are mounted to said engaging and disengaging means so as to form a flow path around said bearing means and axially past said cam means.

9. A reactor assembly as in claim 4, wherein said cam means comprises a wedging surface having an axial dimension substantially the same as the axial dimension of the reacting means.

10. A reactor assembly as in claim 4, wherein said retention means comprises a pair of retention plates made of hardened steel, said reacting means is made of cast aluminum and said means for engaging and disengaging is made of hardened steel.

11. A reactor assembly as in claim 4, wherein said engaging and disengaging means is mounted within said reacting means bore by a mounting process taken from the group consisting of press fitting, welding, bonding or staking.

12. In a torque converter comprised of an impeller, a turbine and a reactor assembly adapted to be mounted a therebetween on a stationary sleeve, the reactor assembly comprising:
 (a) a stator comprising stator blades attached to a stator hub, said stator hub having an axial, essentially cylindrical bore formed therein;
 (b) a first circumferential groove and a second circumferential groove provided in said cylindrical bore;
 (c) a clutch and thrust bearing cartridge unit comprising:

11

(i) first and second retention plates;
(ii) a clutch disposed within said cylindrical bore, said clutch comprising an inner ring and an outer ring, a plurality of cams disposed therebetween, said cams having an axial dimension that is a substantial portion of the axial dimension of said cylindrical bore; spring-biasing means for positioning said cams; said rings, aid spring-biasing means and said cams confined within said first and second retention plates;
(iii) said retention plates each provided with one or more lubrication ports for lubricating said cams; and
(iv) a pair of thrust bearings, each said thrust bearing mounted on the outside surface of a retention plate;
said clutch enclosed by and mechanically engaging said retention plates and said thrust bearings mounted on said retention plates so as to cooperate to form a cartridge unit mountable as a single unit independent of said stator within said cylindrical axial bore, and
(d) first and second snap rings; said clutch mounted within said cylindrical bore between said first snap ring fitted to said first circumferential groove and said second snap ring fitted to said second circumferential groove.

13. In a torque converter having an impeller, a turbine and a stator adapted to be mounted therebetween on a nonrotatable sleeve a clutch comprising:
means for engaging and disengaging the stator to restrict and permit freewheeling motion of the stator relative to the nonrotatable sleeve, said engaging and disengaging means adapted to be received within the stator in an essentially cylindrical axial bore having essentially one diameter and adapted to engage said nonrotatable sleeve, said engaging and disengaging means comprising:
(a) cam means for wedging said reacting means relative to said nonrotatable sleeve in an engaged position and releasing said reacting means relative to said nonrotatable sleeve in a disengaged position;
(b) retention means having inner surfaces and outer surfaces, cooperating with said cam means at said inner surfaces for retaining said cam means between said reacting means and said nonrotatable sleeve, and for providing alignment of said cam means relative to both sides of said cylindrical axial bore;
(c) bearing means for bearing said reacting means against said impeller and against said turbine, said bearing means mounted on outer surfaces of said retention means,
said cam means enclosed by and mechanically engaging said retention means and said bearing means mounted on said retention means so as to cooperate to form an engaging and disengaging means cartridge unit mountable as a single unit independent of said stator and within said cylindrical axial bore;
said engaging and disengaging means and said stator having contact surfaces,
said engaging and disengaging means and said stator adapted to be immovable relative to each other at said contact surfaces.

14. A clutch as in claim 13, wherein said cam means comprises an inner ring, an outer ring, a plurality of rollers, spring-biasing means for positioning said rollers, said rollers and said spring-biasing means retained between said inner and outer rings by a pair of retention plates mounted at opposite axial ends of said rollers.

15. A clutch as in claim 13, wherein said cam means comprises an inner ring, an outer ring, a plurality of sprags, spring-biasing means for positioning said sprags, said sprags and said spring-biasing means retained between said inner and outer rings by a pair of retention plates mounted at opposite axial ends of said sprags.

16. A clutch as in claim 13, further comprising means for lubricating said engaging and disengaging means from both the side located next to the impeller and the side located next to the turbine, said lubricating means comprising one or more lubrication ports formed in said retention means at locations where said bearing means are mounted to said engaging and disengaging means so as to form a flow path around said bearing means and axially past said cam means.

17. A clutch as in claim 13, wherein said cam means comprises a wedging surface having an axial dimension substantially the same as the axial dimension of the stator.

18. A reactor assembly as in claim 13, wherein said retention means comprises a pair of retention plates, and said means for engaging and disengaging and said retention plates are made of hardened steel.

19. In a torque converter comprised of an impeller, a turbine and a stator adapted to be mounted therebetween on a nonrotatable sleeve, said stator having an axial, essentially cylindrical bore formed therein provided with first and second circumferential grooves, a clutch comprising:
(a) first and second retention plates;
(b) an inner ring and an outer ring;
(c) a plurality of cams disposed therebetween, said cams having an axial dimension that is a substantial portion of the axial dimension of the cylindrical bore;
(d) spring-biasing means for positioning said cams;
(e) said rings and said cams confirmed within said first and second retention plates;
(f) said retention plates each provided with one or more lubrication ports for lubrication said cams;
(g) a pair of thrust bearings, each said thrust bearing mounted on the outside surface of a retention plate;
(h) said cams enclosed by and mechanically engaging said retention plates and said thrust bearings mounted on said retention plates so as to cooperate to form a clutch cartridge unit mountable as a single unit independent of said stator within said stator.

20. A torque converter comprising:
(a) an impeller adapted to be connected to an engine flywheel;
(b) a turbine adapted to be connected to an automatic transmission;
(c) a combined reactor assembly interposed coaxially on a nonrotatable sleeve between said impeller and said turbine, said reactor assembly directing coupling fluid between said impeller and said turbine;
(d) said reactor assembly comprising:
(i) a stator comprising stator blades attached to a stator hub, said stator hub having an axial, essentially cylindrical bore formed therein;
(ii) first and second circumferential grooves provided in said cylindrical bore;
(iii) a clutch and thrust bearing assembly disposed within said cylindrical bore comprising first and second retention plates;

a clutch comprising an inner ring and an outer ring, a plurality of cams disposed therebetween, said cams having an axial dimension that is a substantial portion of the axial dimension of said cylindrical bore; spring-biasing means for positioning cams; said rings, cams and spring-biasing means confined within said retention plates;

said retention plates provided with one or more lubrication ports for lubricating said cams; and a pair of thrust bearings, each mounted on the outside surface of a retention plate; and said clutch enclosed by said retention plates and said thrust bearings mechanically mounted on said retention plates so as to cooperate to form a cartridge assembly;

(e) said clutch and thrust bearing assembly mounted as a single unit independent of said stator within said cylindrical bore between a first snap ring fitted to said first circumferential groove and a second snap ring fitted to said second circumferential groove.

21. A clutch cartridge adapted to be mounted as a single unit in a torque converter comprised of an impeller, a turbine and a stator adapted to be mounted therebetween on a nonrotatable sleeve, said stator having an axial, essentially cylindrical bore formed therein, said clutch comprising:
(a) first and second retention plates;
(b) an inner ring and an outer ring;
(c) a plurality of cams disposed therebetween;
(d) spring-biased means for positioning said cams;
(e) said rings and said cams confined within said first and second retention plates, said retention plates secured to said outer ring;
(f) a pair of thrust bearings, each said thrust bearing mounted on an outside surface of a retention plate;
whereby said cams are enclosed by said retention plates and having said thrust bearings mounted on said retention plates so as to cooperate to form a clutch cartridge unit independent of said stator and mountable as a single unit within said stator.

* * * * *